UNITED STATES PATENT OFFICE.

FREDERICK H. L. C. SACC, OF NEUFCHATEL, SWITZERLAND.

IMPROVEMENT IN PROCESSES FOR PRESERVING FRUITS.

Specification forming part of Letters Patent No. 169,591, dated November 2, 1875; application filed October 20, 1875.

CASE A.

*To all whom it may concern:*

Be it known that I, F. H. L. CHARLES SACC, of Neufchatel, in the Swiss Republic, have invented certain new and useful Improvements in Preserving Fruit, of which the following is a specification:

Among the many processes of preserving fruit which have heretofore been used or suggested, there is none which, so far as I am informed, can be practiced without great outlay of capital in apparatus or machinery, or which can be used without destroying the taste and the peculiar flavor of fresh fruit, and also without changing the color, which is none of its least attractions.

The object of my invention is to preserve fruit by a comparatively inexpensive mode, yet so as to preserve the flavor and color of the fruit.

I have attained the object I have in view by a simple composition, consisting, in the main, of a dehydrating and an antiseptic substance, and I propose to use specially, for such dehydratant, sugar, and for such antiseptic, alcohol.

I proceed in the manner as follows: In a glass, tin, or earthenware vessel I put eight pounds of the fruit proposed to be preserved, and I add by dispersing though the mass of fruit four pounds of crushed or powdered sugar. I then pour over the mass one pound of alcohol at 90° centigrade, diluted in two pounds of cold water.

When the fruit to be preserved is red—such as cherries, prunes, or peaches—a little (say five grams) tartaric acid, in powder, is added, to preserve their brilliant color. The vessel containing the fruit thus put up is turned upside down every twenty-four hours, until all the sugar is perfectly dissolved.

To use the fruit, the solution in which it is held should be allowed to drip off. It is then put for twenty-four hours in cold water containing about ten per cent. of sugar. The fruit may then be taken out of the sugar-water, passed through the fresh water, and wiped dry, when it will be ready for use.

The proportions of the sugar, alcohol, and water may be varied according to circumstances. Other ingredients may be added, such as certain essential oils or coloring matter, and certain salts, such as alum, for instance.

It is obvious that the alcohol and sugar which shall have been used for the preservation of fruit may be reclaimed after consumption of the fruit, and used over again for the preservation of other fruit.

Having thus described my invention, and the manner in which the same is or may be carried into effect, what I claim, and desire to secure by Letters Patent, is as follows:

The method herein described of preserving fruits, by the employment of sugar and alcohol, either alone or in connection with other ingredients, substantially in the manner herein set forth.

In testimony whereof I have hereunto signed my name this 19th day of October, A. D. 1875.

SACC.

Witnesses:
   A. POLLOK,
   EWELL A. DICK.